May 7, 1963 J. P. MITCHELL 3,088,208
TROUSER LENGTH GAUGE
Filed Sept. 9, 1957
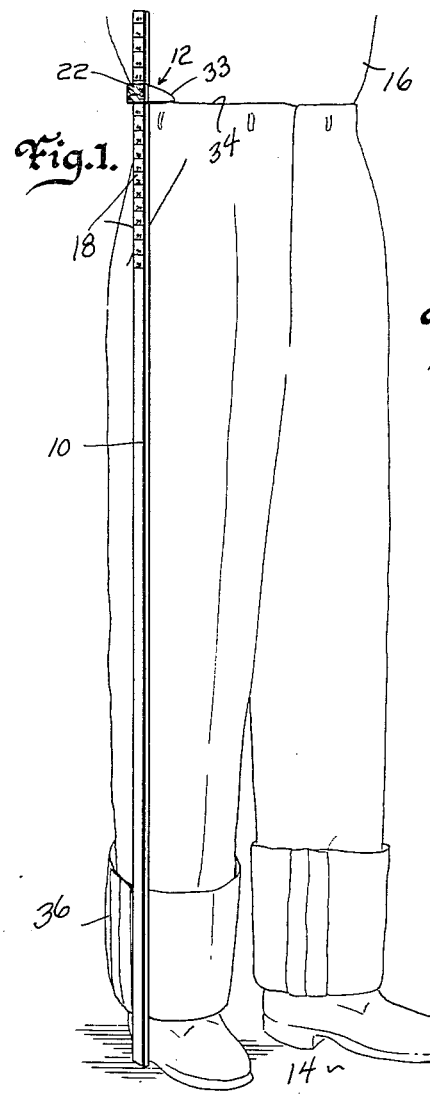
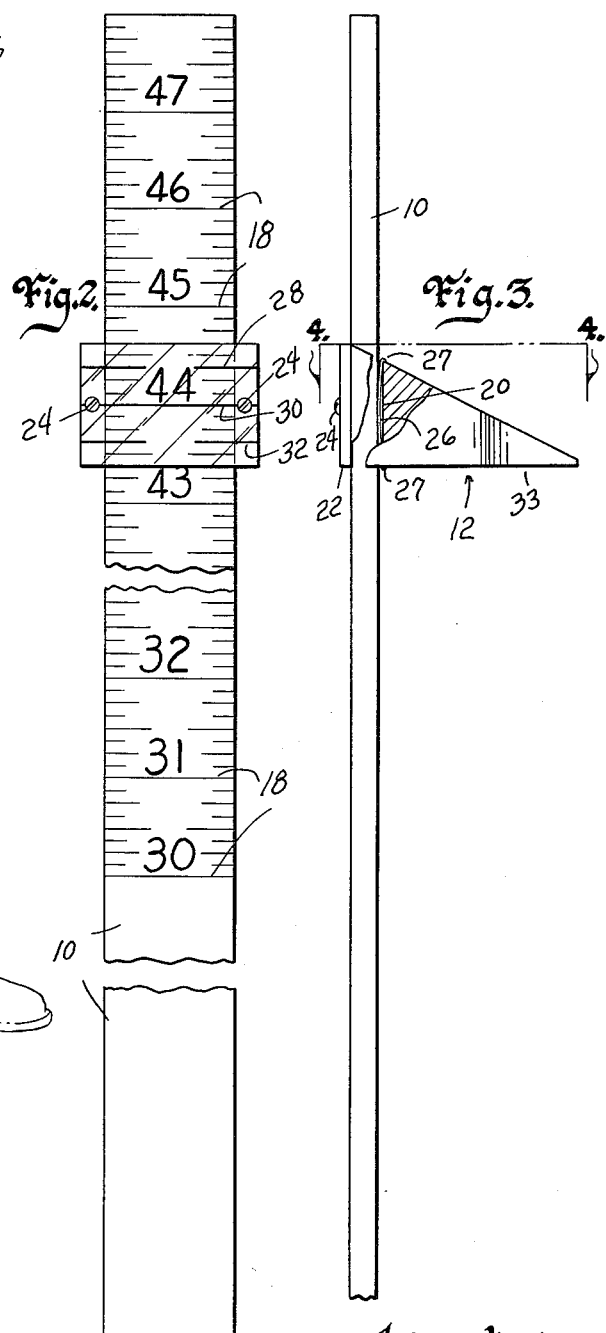
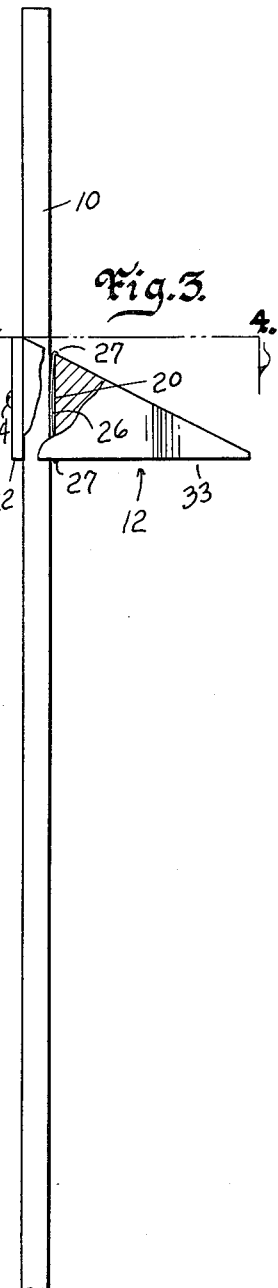
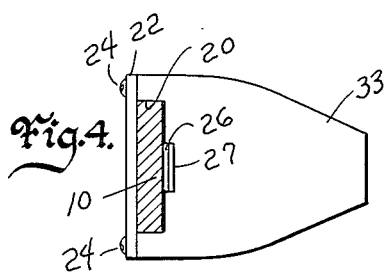
Witness
Edward P. Seeley
Inventor
James P. Mitchell
by Lendrum A. MacEachron
Attorney

United States Patent Office 3,088,208
Patented May 7, 1963

3,088,208
TROUSER LENGTH GAUGE
James P. Mitchell, Forest City, Iowa
Filed Sept. 9, 1957, Ser. No. 682,683
1 Claim. (Cl. 33—2)

This invention is a trouser length gauge that features relatively slidable portions each of which has calibrations on it and which cooperate because of these calibrations to give alternative pant leg length measurements with a single position of the indicator. The unit measures from the top of the pants; whereby embarrassment that could occur with the old inseam measuring is eliminated. Separate measurements are taken for two pant legs which makes for better fitting trousers. The device gives direct readings in terms of the length of the trouser leg measured at the out seam so that errors in taking the measurement is minimized. As the device may be adjusted to take a measurement and then lifted to be read without any need for bending, squatting or stooping, readings are not only taken rapidly, but the energy of the person doing the measuring is conserved. Operation of the device is very simple also, and any normal person can learn to use it with a single demonstration.

Accordingly it is the main object of this invention to provide a novel trouser length gauge; one that:
(1) Minimizes the possibilites for error in measuring the length of trousers.
(2) Is fast and easy to use.
(3) Conserves the energy of the user.
(4) Avoids any possibility of the embarrassment sometimes attendant upon the use of tapes for inseam measuring.

While the foregoing specifically listed objects are the principal ones of this invention, it is my intention to include any such as become clear to a skilled person in this field of endeavor after reading this specification and examining the accompanying drawings that are briefly described as follows:

FIG. 1 is a perspective view of the device in a position of use with a person being fitted shown in fragment in light line.

FIG. 2 is a front elevation of the device drawn to a larger scale than that of FIG. 1 and with portions of the device broken away to conserve space.

FIG. 3 is a side elevation of the device drawn to the same scale as FIG. 2 with portions of the device broken away to conserve space and other portions of the device broken away to illustrate more fully the construction of the device.

FIG. 4 is a cross section of the device taken on the line 4—4 of FIG. 3 and drawn to the same scale as that figure.

In the drawings the invention is seen to consist of two members 10 and 12 that are relatively slidable in respect to each other. In the preferred form here shown, the elongated member or rule 10 is long enough to reach from a surface 14 on which a person 16 in FIG. 1 stands while being fitted to the waist of the tallest person one is likely to want to measure for a trouser fit. I have found that fifty and five-eighths inches is an adequate length. At the top of the rule 10 is a series of calibrations 18 each complete lines of which is assigned a number. These numbers refer to inches. The spaces between the complete lines may be reasonably subdivided, as into eighths. While the lowest number shown identifying a calibration is thirty, the lowest calibration line is more than thirty inches from the bottom of rule 10. In the case of the structure shown the line identified as thirty is actually thirty-two and five-eighths inches from the bottom of the rule 10. This difference between the actual distance and the numbers on the various calibrations on rule 10 to-gether with other structure recited hereafter makes the device a direct reading one. This is a major reason why it is less subject to error than known devices for performing this same job prior to my invention.

Slidably mounted on the rule 10 is the indicator 12. It is provided with a channel 20 that embraces rule 10 in sliding fit. At least the side 22 of the indicator 12, side 22 being that which faces the numbers of the calibrations 18, is preferably transparent. For this reason the numbers of the calibrations are easily seen. If the indicator is made in two pieces, as shown in the drawings, side 22 is secured to the indicator 12 in any suitable manner as by the screws 24. Some suitable means such as the spring 26 is used to maintain a given position of indicator 12 on rule 10. At the same time, spring 26 yields sufficiently to permit ready movement of the incidator along the rule as with the hand. On the side 22 of indicator 12 there are three spaced calibrations 28, 30 and 32. These three calibrations cooperate with the ones 18 on rule 10 to make the gauge not only direct reading but capable of giving alternative readings for different styles of break in the pant leg. As shown in FIGURES 2 and 3, the center calibration 30 on side 22 is spaced from each of the other two by three-eighths of an inch. Thus calibration 28 shows a higher reading and 32 a lower reading than calibration 30 for any given position of the indicator 12 on the rule 10. Indicator 12 has a pointer 33 that is tapered to give a pleasing appearance and also to give a precise measuring point.

Spring 26 has its ends bent form the hooks 27 that grip the edges of slot 20 to hold the spring in the indicator even when it is not embracing the rule. Thus the spring will not be lost in the event the two portions of the gauge become separated from each other whether by accident or by intention of the user.

In use, the gauge is placed in a vertical position next to the outseam of the trousers being fitted, as shown in FIG. 1. The person arranges the trousers at the waist in the manner that he intends to wear them. Pointer 33 is then brought into light contact with the waist band 34, and the measuring of the one leg is complete. Spring 26 will retain the relative positions of the rule and indicator so they may be lifted for easy examination of the measurement indicated. If the person purchasing the trousers wants a regular break in his pant leg, the inches read at the calibration 30 are recorded. In FIG. 2, for example, the reading is forty-four inches. The right leg of the trousers should be made to such a length that the bottom of the finished cuff is forty-four inches from the top of the waist band when measured at the outside seam. The same process is then carried out for the left leg, as a person's legs are not of necessity the same length. Measuring the two pant legs separately will produce a better fit in many cases, therefore, than would be true when a single measurement taken at the crotch is relied upon. If in my example the person desires a full break in his finished pants, the reading is taken at calibration 28 to give a leg length of forty-four and three-eighths inches. Using the figure at calibration 32 will give a reading that is three-eighths of an inch shorter than the reading at calibration 30. In the event of any of the measurements taken, the distance from the top of waist band 34 to the surface 14 will be greater by a predetermined amount than the measurement taken. As shown clearly in FIG. 2, the bottom of indicator 12 that engages the waist band 34 is two-eighths of an inch below calibration 32, five-eighths of an inch below 30 and a full inch below 28. Since it is the bottom of the indicator that touches the waist band, and the calibration of the rule 10 are two and five-eighths inches farther from the bottom of the rule than the numbers indicate; a pant leg made according to the readings of the calibration 32 will reach to within two and three-eighths inches of the surface 14, one taken at 30 to within two inches and only one and five-eighths when the reading is taken at 28. These measurements are those that produce very satisfactory results with the present styles of pants. Obviously the principles of this gauge may be applied to a gauge that will serve for other waist supported garments as well.

As my gauge measures from a point on the trousers that is relatively stable as compared to the crotch of a pair of trousers, the measurements will be accurate even when made by a rather inexperienced person. It is also clear that it be a matter of minutes to show any normal person how to use my gauge. Another advantage of my gauge is that it measures in reference to a finished portion of the trousers as compared to the old inseam measuring where an attempt to guess the length of the trousers by turning up rough cuffs 36 was a necessary part of taking the measurement. Obviously also there is no need to reach up into the crotch of a person so either a man or a woman may serve as sales personnel for all persons who may wish to buy waist supported clothing. As the gauge may be lifted to be read, the clerk can take a very accurate reading without even leaning over which not only conserves energy but makes it possible perhaps for older persons who have lost some of their youthful agility to continue easily to carry on this type of sales work.

I have disclosed my invention by showing and describing the preferred practical embodiment of it. I now set out with the particularity required by statute those structures or other limitations that I believe to be my inventive contribution.

I claim:

In a trouser gauge: an elongated element having a scale of calibrations at one end; numbers identifying points on said scale of calibrations, said numbers representing, less by a predetermined amount, the distance from the identified point on the scale to the other end of said elongated element; and an indicator slidably embracing said elongated element; said indicator having three calibrations on it spaced from each other along the same axis as said indicator slides on said elongated element.

References Cited in the file of this patent

UNITED STATES PATENTS

| | | |
|---|---|---|
| 779,882 | Simpson | Jan. 10, 1905 |
| 1,230,627 | Thompson | June 19, 1917 |
| 1,425,175 | Childs | Aug. 8, 1922 |
| 2,179,658 | Gallagher | Nov. 14, 1939 |
| 2,677,889 | De Pew | May 11, 1954 |

FOREIGN PATENTS

| | | |
|---|---|---|
| 531,364 | Canada | Oct. 9, 1956 |